US012643276B2

(12) United States Patent (10) Patent No.: US 12,643,276 B2
Koenig et al. (45) Date of Patent: Jun. 2, 2026

(54) EXTRUDER COMPRISING A PARTICULAR ARRANGEMENT OF ASYMMETRICAL SCREW ELEMENTS ON SCREW SHAFTS

(71) Applicant: Covestro Deutschland AG, Leverkusen (DE)

(72) Inventors: Thomas Koenig, Leverkusen (DE); Ulrich Liesenfelder, Bergisch Gladbach (DE); Roland Engberg, Düsseldorf (DE); Gudrun Schmidt, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 579 days.

(21) Appl. No.: 18/032,253

(22) PCT Filed: Oct. 19, 2021

(86) PCT No.: PCT/EP2021/078863
§ 371 (c)(1),
(2) Date: Apr. 17, 2023

(87) PCT Pub. No.: WO2022/084272
PCT Pub. Date: Apr. 28, 2022

(65) Prior Publication Data
US 2023/0390986 A1     Dec. 7, 2023

(30) Foreign Application Priority Data
Oct. 22, 2020     (EP) ..................................... 20203230

(51) Int. Cl.
B29C 48/405     (2019.01)
B29C 48/25     (2019.01)
(Continued)

(52) U.S. Cl.
CPC ........ B29C 48/405 (2019.02); B29C 48/2517 (2019.02); B29C 48/2715 (2019.02);
(Continued)

(58) Field of Classification Search
CPC ........... B29B 7/421; B29B 7/42; B29B 7/489; B29B 7/483; B29B 7/429; B29B 7/482;
(Continued)

(56) References Cited

U.S. PATENT DOCUMENTS 8,876,360 B2 * 11/2014 Bierdel ................. B29C 48/251
366/82
8,915,642 B2 * 12/2014 Bierdel ................... B29B 7/489
366/82
(Continued)

FOREIGN PATENT DOCUMENTS

DE      202015104765 U1     1/2016
WO     WO-2011039016 A1 *     4/2011    ............. B29C 48/40
(Continued)

OTHER PUBLICATIONS

International Search Report for International Patent Application No. PCT/EP2021/078863, mailed Jan. 28, 2022.
(Continued)

*Primary Examiner* — Charles Cooley
(74) *Attorney, Agent, or Firm* — K&L Gates LLP

(57)     ABSTRACT

A multishaft extruder is provided having screw shafts that rotate in the same sense and at the same speed, wherein these screw shafts each have at least one region having a special arrangement of screw elements, wherein the screw elements have an asymmetrical cross-sectional screw profile. In this case, the at least one region is situated directly opposite on directly adjacent screw shafts. The the use of the extruder for processing or production of plastic or viscoelastic masses is also provided.

15 Claims, 4 Drawing Sheets

(51) Int. Cl.
  B29C 48/27 (2019.01)
  B29C 48/40 (2019.01)
  B29C 48/605 (2019.01)
  B29C 48/65 (2019.01)

(52) U.S. Cl.
  CPC .......... B29C 48/402 (2019.02); B29C 48/605 (2019.02); B29C 48/65 (2019.02)

(58) Field of Classification Search
  CPC ......... B29B 7/481; B29C 48/47; B29C 48/57; B29C 48/405; B29C 48/2517; B29C 48/2715; B29C 48/402; B29C 48/605; B29C 48/65; B29C 48/03; B29C 48/425
  See application file for complete search history.

(56) References Cited

U.S. PATENT DOCUMENTS

| | | | | |
|---|---|---|---|---|
| 9,688,002 | B2 * | 6/2017 | Bierdel | B29C 48/507 |
| 9,738,025 | B2 * | 8/2017 | König | B29B 7/489 |
| 9,808,978 | B2 * | 11/2017 | Bierdel | B29C 48/2517 |
| 9,868,245 | B2 * | 1/2018 | Bierdel | B29C 48/507 |
| 10,029,393 | B2 * | 7/2018 | Bierdel | B29B 7/489 |
| 10,836,076 | B2 * | 11/2020 | Bierdel | B29C 48/2715 |
| 2009/0274003 | A1 * | 11/2009 | Blach | B29C 48/2564 |
| | | | | 366/300 |
| 2011/0075511 | A1 * | 3/2011 | Bierdel | B29C 48/405 |
| | | | | 366/301 |
| 2011/0096617 | A1 * | 4/2011 | Bierdel | B29C 48/2715 |
| | | | | 366/84 |
| 2011/0110183 | A1 * | 5/2011 | Bierdel | B29C 48/57 |
| | | | | 29/889 |
| 2011/0112255 | A1 * | 5/2011 | Bierdel | B29C 48/402 |
| | | | | 526/348 |
| 2011/0158039 | A1 * | 6/2011 | Bierdel | B29B 7/483 |
| | | | | 366/301 |
| 2011/0160381 | A1 * | 6/2011 | Konig | B29C 48/65 |
| | | | | 366/85 |
| 2011/0180949 | A1 * | 7/2011 | Bierdel | B29B 7/481 |
| | | | | 264/70 |
| 2011/0184089 | A1 * | 7/2011 | Bierdel | B29C 48/2715 |
| | | | | 528/196 |
| 2012/0182823 | A1 | 7/2012 | Burkhardt | |
| 2012/0188840 | A1 | 7/2012 | Blach | |
| 2013/0033956 | A1 * | 2/2013 | Kirchhoff | B29C 48/285 |
| | | | | 366/83 |
| 2017/0252948 | A1 * | 9/2017 | Bierdel | B29C 48/2715 |
| 2019/0061200 | A1 * | 2/2019 | Bierdel | B29B 7/481 |
| 2022/0126245 | A1 * | 4/2022 | Mannel | B29C 48/2561 |
| 2025/0242533 | A1 * | 7/2025 | Koenig | B29C 48/405 |

FOREIGN PATENT DOCUMENTS

| | | | | |
|---|---|---|---|---|
| WO | WO-2014206865 A1 * | 12/2014 | ............ | B29C 48/57 |
| WO | WO-2022084272 A1 * | 4/2022 | .......... | B29C 48/405 |

OTHER PUBLICATIONS

Written Opinion for International Patent Application No. PCT/EP2021/078863, mailed Jan. 28, 2022.

* cited by examiner

Fig. 3
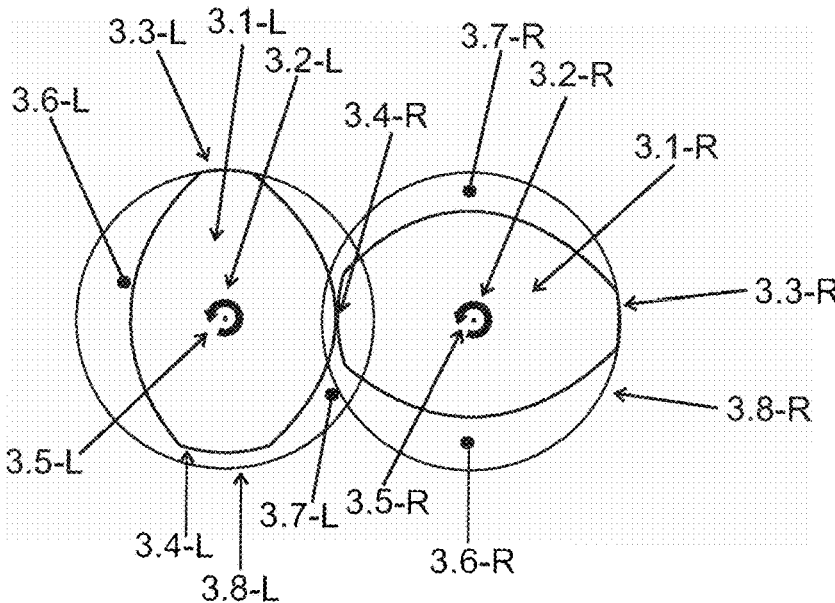
Fig. 4:
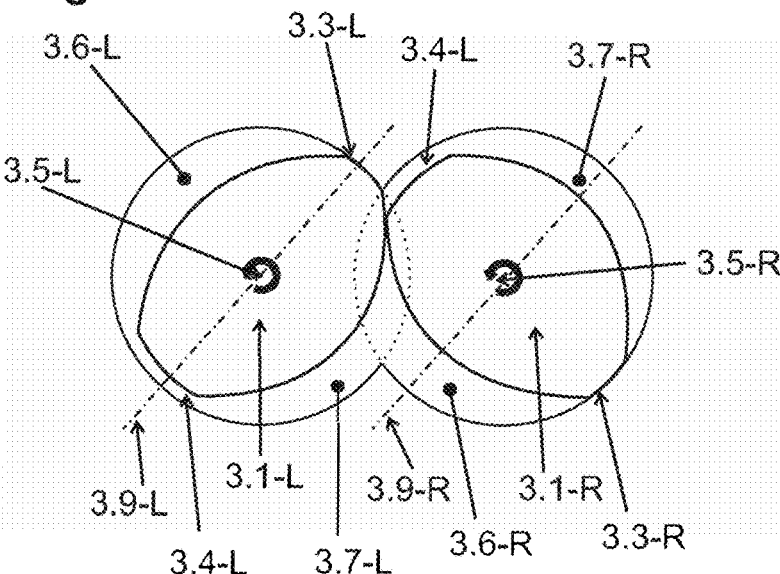
Fig. 4A
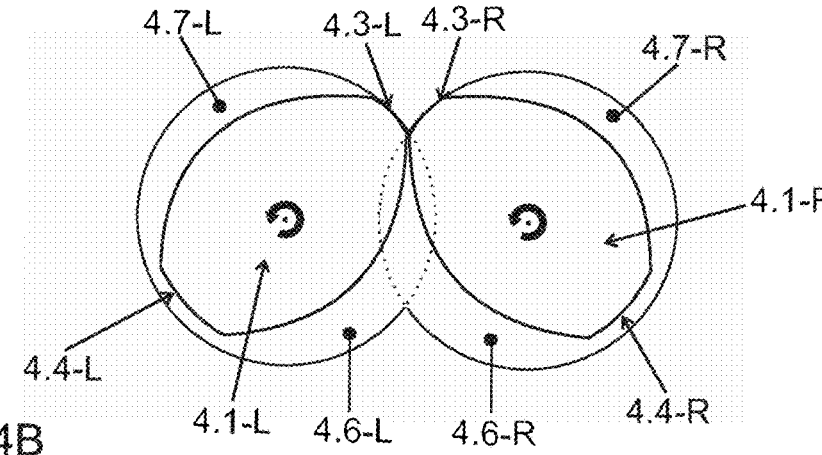
Fig. 4B

Fig. 5:
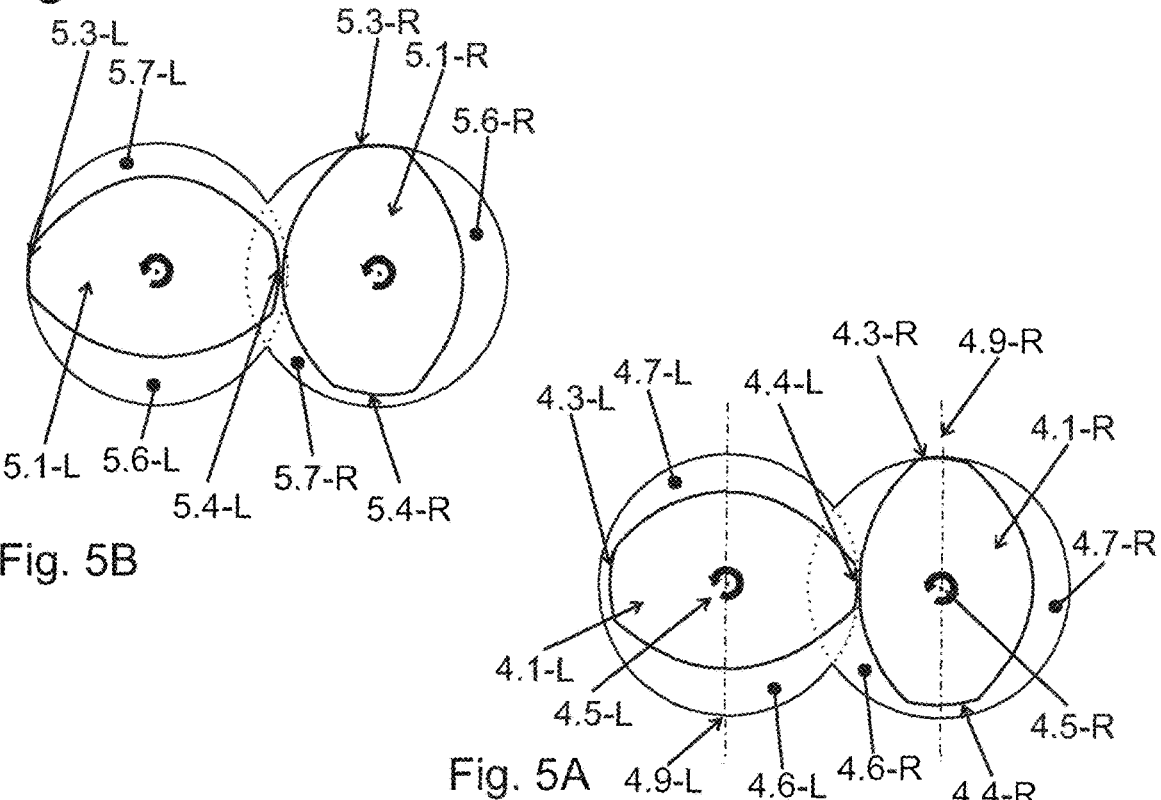
Fig. 5B
Fig. 5A
Fig. 6:
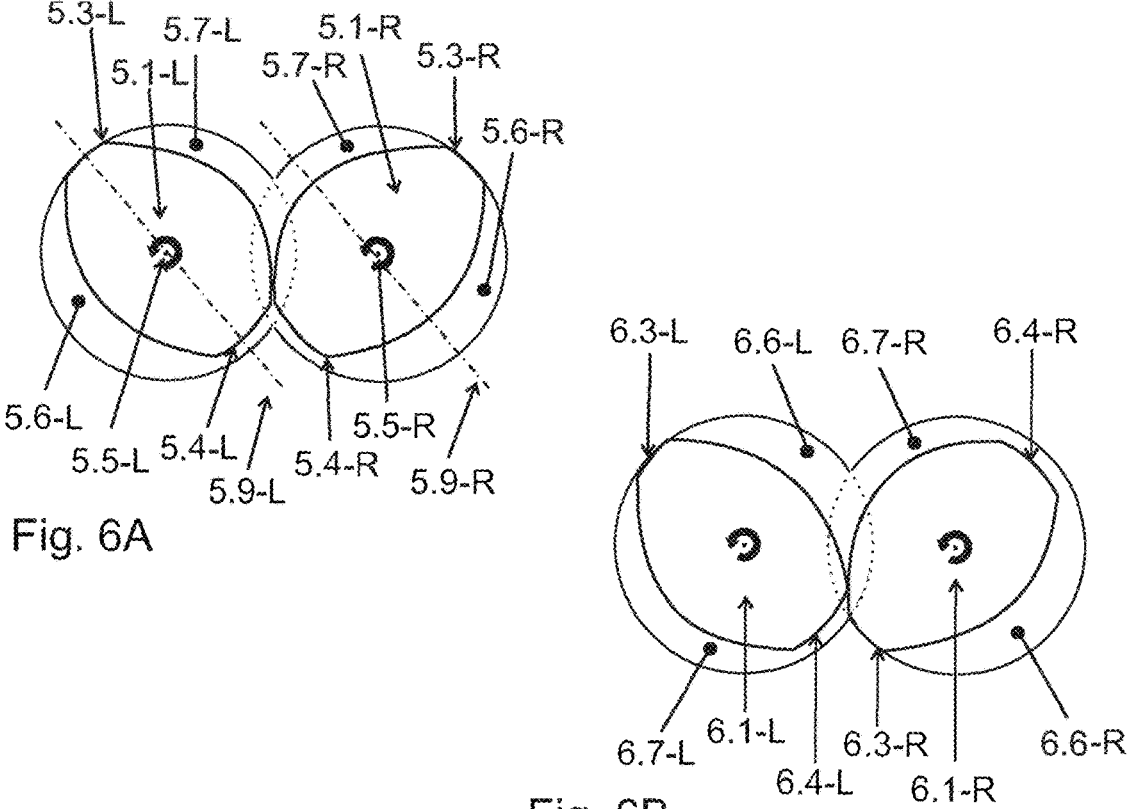
Fig. 6A
Fig. 6B

Fig. 7:
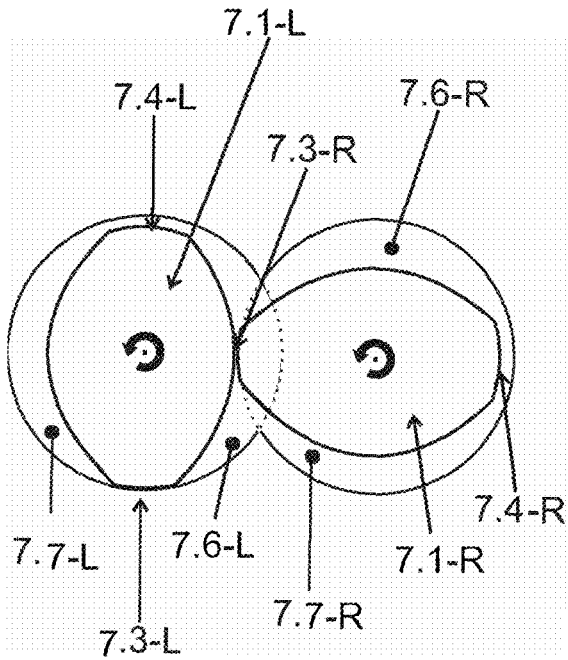
Fig. 7B
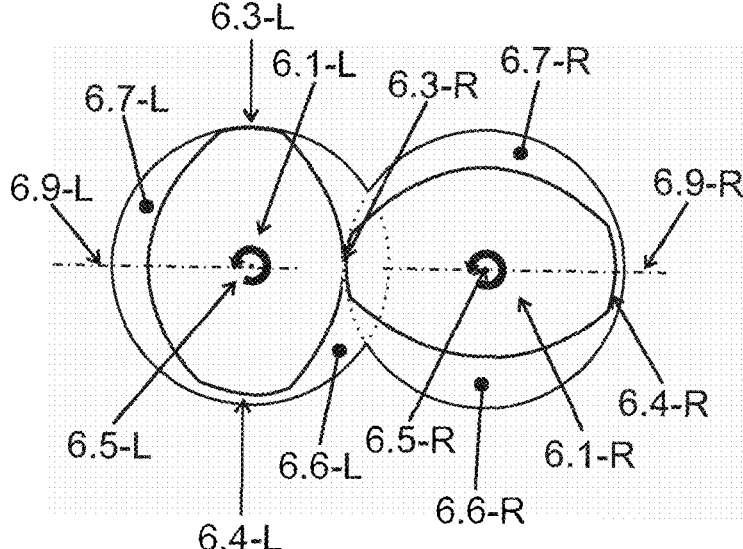
Fig. 7A

EXTRUDER COMPRISING A PARTICULAR ARRANGEMENT OF ASYMMETRICAL SCREW ELEMENTS ON SCREW SHAFTS

CROSS REFERENCE TO RELATED APPLICATIONS

This application is a U.S. national stage application, filed under 35 U.S.C. § 371, of International Application No. PCT/EP2021/078863, which was filed on Oct. 19, 2021, which claims priority to European Patent Application No. 20203230.6, which was filed on Oct. 22, 2020. The contents of each are hereby incorporated by reference into this specification.

FIELD

The present invention relates to a multishaft extruder having screw shafts that rotate in the same sense and at the same speed, wherein these screw shafts each have at least one region having a special arrangement of screw elements, wherein the screw elements have an asymmetrical cross-sectional screw profile. In this case, these in each case at least one regions are situated directly opposite on directly adjacent screw shafts. The present invention also provides for the use of the extruder of the invention for processing or production of plastic or viscoelastic masses.

BACKGROUND

In the context of the present invention, a multishaft extruder is understood to mean an extruder having more than one screw shaft, for example an extruder having two, three or four screw shafts or else an extruder having eight to sixteen, especially twelve, screw shafts in an annular arrangement. In the case of more than two screw shafts, the axes of rotation of the screw shafts may be arranged alongside one another in a polygon having a number of vertices equal to the number of shafts, or else, for example—as in the case of what is called a ring extruder—in annular form. In multi-screw extruders in the sense of the present invention, the axes of rotation of the screw shafts are arranged parallel to one another. Such an extruder having more than one screw shaft is also referred to as a multishaft screw machine or multishaft extruder. A twin-shaft screw machine is also referred to hereinafter as a twin-screw extruder. In the context of the present invention, the term "extruder" is used synonymously with the term "screw machine". The multishaft extruder of the invention is preferably an extruder having screw shafts that rotate at the same speed and in the same sense. The multishaft extruder of the invention is more preferably a twin-screw extruder having screw shafts that rotate at the same speed and in the same sense or a multishaft extruder having multiple—especially eight or twelve—screw shafts that rotate at the same speed and in the same sense and are arranged in a ring with respect to one another; most preferably, the multishaft extruder of the invention is a twin-screw extruder having screw shafts that rotate at the same speed and in the same sense.

In the context of the present invention, an asymmetrical cross-sectional screw profile is distinguished by the fact that there is no mirror axis through any point in the plane of the cross-sectional screw profile that can be used to generate a cross-sectional screw profile congruent with an original cross-sectional screw profile; there is preferably no mirror axis through any point within a cross-sectional screw profile, particularly preferably no mirror axis through the structural centre of the cross-sectional screw profile, that can be used to generate a profile congruent with the original profile. In this case, the structural centre is the point within the cross-sectional screw profile which is the centre of all circular arcs that form flight lands and grooves.

In the context of the present invention, this means that two cross-sectional screw profiles are congruent if a first cross-sectional screw profile and a second cross-sectional screw profile can be transformed into one another either by rotation or translation on the plane of the cross-sectional screw profile or rotation and translation on the plane of the cross-sectional screw profile. Accordingly, two cross-sectional screw profiles are not congruent if a first cross-sectional screw profile and a second cross-sectional screw profile cannot be transformed into one another either by rotation or translation on the plane of the cross-sectional screw profile or by rotation and translation on the plane of the cross-sectional screw profile.

Within the scope of the present invention, it is also possible for an asymmetrical screw element to be mounted on the core shaft of the screw shaft in such a way that the asymmetrical screw element can rotate eccentrically with respect to the axis of rotation of the core shaft. The axis of rotation of the core shaft of a screw shaft coincides with the axis of rotation of the screw shaft. In the context of the present invention, a screw element eccentrically mounted on the core shaft of the screw shaft is distinguished by the fact that the centre of rotation of the cross-sectional screw profile of this screw element lies outside the structural centre of the cross-sectional screw profile.

In the context of the present invention, the term "cross-sectional screw profile", also called "screw profile" for short, is understood to mean the outer contour of a screw element in cross section at right angles to the axis of rotation of the core shaft on which the screw element is mounted for use as intended.

The uses of extruders, especially multishaft extruders, include the devolatilization or compounding of plastic or viscoelastic masses, especially the devolatilization or compounding of plastics, and in turn especially the devolatilization or compounding of melts or solutions of thermoplastic polymers or melts or solutions of rubbers. It is also possible to use extruders, in particular multishaft extruders, for the reactive extrusion of plastic or viscoelastic masses, in particular for the reactive extrusion of thermoplastic polyurethanes.

Both devolatilizing extruders and compounding extruders as well as extruders for reactive extrusion are well known from the technical literature, for example from

[1] ([1]=*Klemens Kohlgrüber: Der gleichläufige Doppelschneckenextruder* [*Codirectional Twin-Screw Extruders*], *2nd Edition*, Hanser Verlag München 2016, pages 50-63, 63-66 and 755-757).

Multishaft extruders in which asymmetrical screw elements are mounted on the core shaft of a screw shaft are likewise known, for example from WO 2011/006516 A1.

According to the disclosure of WO 2011/006516 A1, these screw elements, which are mounted asymmetrically on the core shafts of the screw shafts of a multishaft extruder, are each mounted on the core shaft of a screw shaft in such a way that a screw profile of a first screw element can be transformed into the screw profile of a screw element situated directly in front of or behind it on the same screw shaft by rotation and, where applicable, by additional translation.

In the case of the double-flight screw elements disclosed in WO 2011/006516 A1, the first flight land is at a greater distance from the centre of rotation of the screw element than a second flight land. Thus, this first flight land is at a shorter distance from the housing inner wall of the housing bore than this second flight land; the first flight land thus has the narrowest gap relative to the housing inner wall of the housing bore.

In the arrangement of the screw elements on a screw shaft disclosed in WO 2011/006516 A1, this leads to one channel of the two channels of the screw shaft running empty because the flight land at the shorter distance from the centre of rotation of the screw element does not completely strip the housing inner wall. As a result, particularly when a multishaft extruder is partially filled during the extrusion of the mass to be extruded, it runs out of the channel which is situated ahead of the flight land at the shorter distance from the centre of rotation of the screw element in the direction of rotation, into the channel which is situated behind it, that is to say the channel which is situated ahead of the flight land at the larger distance from the centre of rotation of the screw element in the direction of rotation. This leads to what is referred to as "running empty" of a channel.

Multishaft extruders, in which screw elements with a symmetrical screw profile, which are mounted eccentrically on the core shaft of a screw shaft, are likewise known, for example from WO 2011/116965 A1.

In the case of screw elements having three or more flight lands, in which a first flight land is at a greater distance from the centre of rotation of the screw element than a second flight land or further flight lands, that is to say this first flight land is at the greatest distance from the centre of rotation of the screw element, it happens that, particularly in the case of partial filling of a multi-screw extruder, all the channels except the channel which is ahead of the flight land at the greatest distance from the centre of rotation of the screw element in the direction of rotation run empty.

In such a case, the shorter flight land or the shorter flight lands is/are thus ineffective during extrusion. This leads to less surface renewal, a smaller devolatilization surface, a poorer mixing effect, and poorer dispersion. In the case of a devolatilizing extruder, the lower surface renewal and the smaller devolatilization surface are particularly disadvantageous, and, in the case of a compounding extruder and of reactive extrusion, the poorer mixing effect and the poorer dispersion, in particular, are disadvantageous. One disadvantage both in the case of a devolatilizing extruder and in the case of a compounding extruder as well as of reactive extrusion is the reduced exchange of heat, which can lead to overheating and thus to damage to the mass to be extruded— also called extrudate for short. Particularly in the case of reactive extrusion, it is necessary to enable the extrudate to be cooled effectively.

Moreover, particularly in the case of partial filling of a multishaft extruder in the case of extruders which have a devolatilization dome, an unwanted accumulation of extrudate occurs in the region of this devolatilization dome. This accumulation in the region of the devolatilization dome leads to a lengthening of the dwell time of the extrudate accumulated there and thus to different dwell times of different parts of the extrudate, which may lead to impairment of the properties of the extrudate. Particularly in the case of reactive extrusion, this leads to poorer properties of the extrudate. It may even happen that some of the extrudate remains in the region of the devolatilization dome for so long that it completely degrades and forms what are known as "black specks". This results in severe quality losses in the extrudate and high reject rates. Moreover, the devolatilization dome has to be cleaned more frequently in such cases, leading to increased downtimes.

In the context of the present invention, an extruder is partially filled in a certain section of space comprising the cross section if from 5% to 90% of the space available for extrusion of the extrudate in this section is filled with this extrudate.

Moreover, particularly in the case of partial filling in the case of extruders with screw shafts arranged horizontally side by side, such as, for example, a two-screw extruder, it can happen that the extrudate accumulates in a housing bore of one of the screw shafts. This further reinforces the abovementioned disadvantages and leads, particularly in the case of reactive extrusion, to poorer properties of the extrudate since, as already explained above, there are differences in the dwell times of different parts of the overall extrudate in the extruder.

WO 2011/006516 A1 attempts to eliminate these disadvantages by arranging two asymmetrical, at least two-flight, screw elements in series in such a way that their screw profiles are offset with respect to one another by rotation on one and the same screw shaft.

However, the above-described disadvantages also occur in the arrangement according to WO 2011/006516 A1 since, owing to the fact that two directly successive asymmetrical, at least two-flight screw elements are offset from one another only by rotation on their respective shaft, the screw profiles of these screw elements can therefore be transformed into one another by rotation, it is further the case that the channel which, in the cross-sectional region of a first screw element, is ahead of the flight land at the greatest distance from the centre of rotation of the screw element in the direction of rotation is also once again ahead, in the cross-sectional region of a second screw element directly following the first screw element, of a flight land which is at the greatest distance from the centre of rotation of the screw element. Thus, the same geometric arrangement is again present.

Once again, the result is that, either the narrow channel, that is to say the channel formed by the groove at the smaller distance from the centre of rotation, is always ahead of the narrow gap in the axial direction in the same housing bore in the direction of rotation, or the wide channel, that is to say the channel formed by the groove at the larger distance from the centre of rotation, is ahead of the narrow gap.

In the case of partial filling, therefore, what is known as "running empty" of a channel continues to occur. Moreover, this does not prevent the extrudate from collecting in a housing bore.

Moreover, when completely full, that is to say when, in the case of an extruder, in a certain space section comprising the cross section, more than 90% of the space available for extruding the extrudate in this section is filled with this extrudate, the arrangements shown in WO 2011/006516 A1 and WO 2011/116965 A1 have the disadvantage that only a little extrudate is exchanged both between the channels of a screw shaft and between the housing bores. In this way, it is also not possible, where there are two successive screw elements on a screw shaft, in the case of the second screw element in the conveying direction, to change the channel volume ahead of a flight land of this second screw element in the conveying direction, irrespective of the position of the corresponding flight land of the preceding screw element. As a result, there is little heat exchange and little mixing of the extrudate.

SUMMARY

It is an object of the present invention to overcome the disadvantages of the prior art mentioned.

In particular, it is an object of the present invention to provide an extruder that overcomes the disadvantages of the prior art mentioned.

It is furthermore in particular an object of the present invention to provide a multishaft extruder by means of which it is possible to prevent one channel or a plurality of channels of a screw shaft or a housing bore or a plurality of housing bores from running empty or—if an extruder has a devolatilization dome—to prevent unwanted accumulation of extrudate in the region of a devolatilization dome of an extruder.

Surprisingly, the object is achieved by an extruder having the features of the main claim.

The invention therefore provides, in a first embodiment, an extruder having two or more parallel screw shafts that rotate in the same sense and at the same speed, the directly adjacent axes of rotation of which all have the same axis spacing a, and having two or more interpenetrating circular housing bores around the respective axes of rotation, each of which has an identical housing inner diameter dg and the respective directly adjacent bore centres of which have a spacing which is equal to the axis spacing a, and the respective directly adjacent bore centres of which coincide with the centres of the cross sections of the respective directly adjacent axes of rotation of the screw shafts, wherein in each case at least two screw elements with an asymmetrical screw profile are situated directly opposite one another on at least two directly adjacent screw shafts, and wherein the screw elements with an asymmetrical screw profile which are situated directly opposite one another on at least two directly adjacent screw shafts clean one another exactly, and wherein the at least two screw elements with an asymmetrical screw profile which are situated on in each case one screw shaft follow on directly from one another axially, and wherein the screw profile of the second screw element of the at least two directly successive screw elements with an asymmetrical screw profile on a first screw shaft of the at least two directly adjacent screw shafts is a screw profile which is not congruent with the screw profile of the first of the at least two directly successive screw elements with an asymmetrical screw profile on this first screw shaft of the at least two directly adjacent screw shafts, wherein a screw profile is asymmetrical if, for the respective screw profile, there is no mirror axis through any point in the plane of the respective screw profile by means of which a screw profile which is congruent with this screw profile can be produced, and wherein two screw profiles are not congruent if a first screw profile and a second screw profile cannot be transformed into one another either by rotation or translation on the plane of the screw profile or by rotation and translation on the plane of the screw profile.

Figure 1:
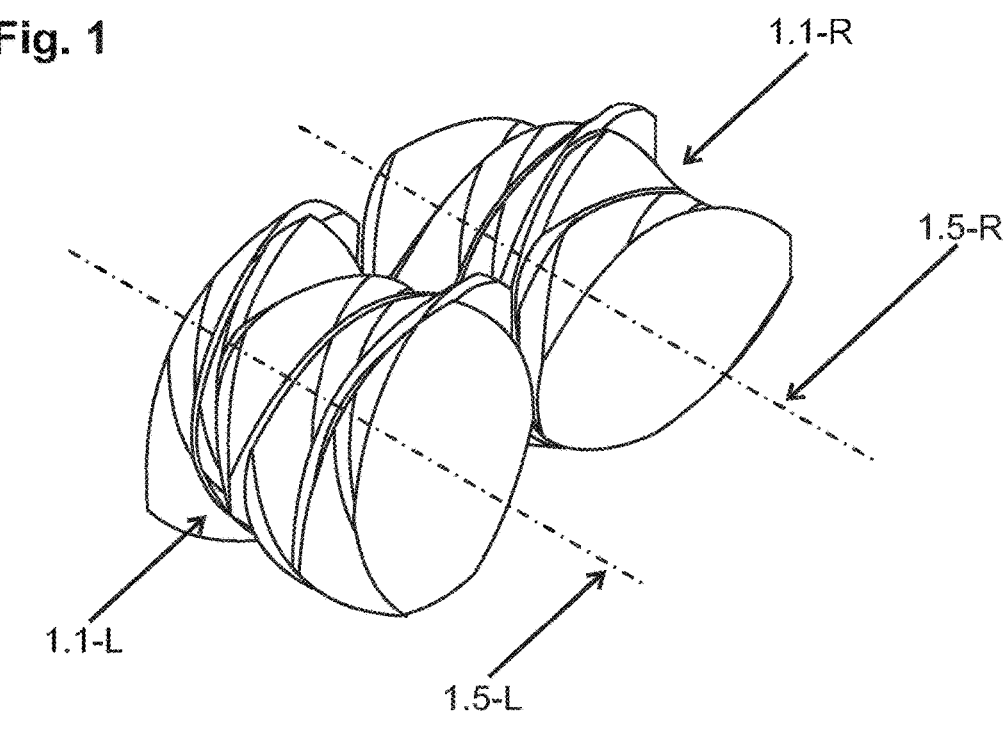
FIG. 1 shows, in an isometric projection, in each case a section of two directly adjacent screw shafts, a left screw shaft 1.1-L and a right screw shaft 1.1-R, wherein the screw shafts 1.1-L and 1.1-R each have a sequence of conveying elements with a double-flight asymmetrical screw profile and the screw shafts 1.1-L and 1.1-R are suitable for a twin-screw extruder having screw shafts that rotate in the same sense and at the same speed. In this case, the screw profiles on the two screw shafts of directly opposite screw elements are configured to clean one another exactly, with the result that the corresponding screw elements clean one another exactly. The left axis of rotation 1.5-L and the right axis of rotation 1.5-R through the respective centres of rotation of the screw profiles are also depicted in FIG. 1.

3.1-L first left screw element,
3.1-R first right screw element,
4.1-L second left screw element,
4.1-R second right screw element,
5.1-L third left screw element,
5.1-R third right screw element,
6.1-L fourth left screw element,
6.1-R fourth right screw element,
7.1-L fifth left screw element,
7.1-R fifth right screw element,
7.1-L fifth left screw element,
3-3 section plane 3-3 at the beginning of the first screw element pair 3.1-L and 3.1-R,
4A-4A section plane 4A-4A at the end of the first screw element pair 3.1-L and 3.1-R,
4B-4B section plane 4B-4B at the beginning of the second screw element pair 4.1-L and 4.1-R,
5A-5A section plane 5A-5A at the end of the second screw element pair 4.1-L and 4.1-R,
5B-5B section plane 5B-5B at the beginning of the third screw element pair 5.1-L and 5.1-R,
6A-6A section plane 6A-6A at the end of the third screw element pair 5.1-L and 5.1-R,
6B-6B section plane 6B-6B at the beginning of the fourth screw element pair 6.1-L and 6.1-R,
7A-7A section plane 7A-7A at the end of the fourth screw element pair 6.1-L and 6.1-R,
7B-7B section plane 7B-7B at the beginning of the fifth screw element pair 7.1-L and 7.1-R.

The other figures, from FIG. 3 to FIG. 7, further explain the screw element arrangement of the invention without the invention being limited to these embodiments.

Figure 2:
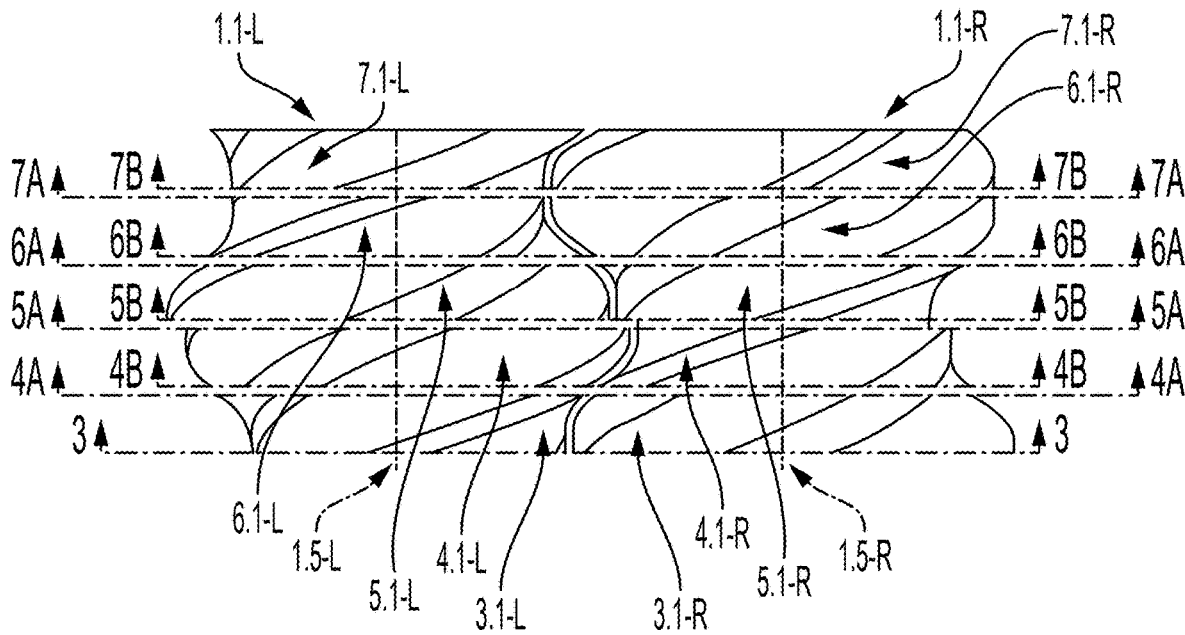
FIG. 2 shows the arrangement from FIG. 1 in an orthogonal projection. A left screw shaft 1.1-L (corresponding to the left screw shaft 1.1-L from FIG. 1) and a right screw shaft 1.1-R (corresponding to the right screw shaft 1.1-R from FIG. 1) can be seen. Also visible in FIG. 2 is the left axis of rotation 1.5-L (corresponding to the left axis of rotation 1.5-L from FIG. 1) and the right axis of rotation 1.5-R (corresponding to the right axis of rotation 1.5-L from FIG. 1) through the respective centres of rotation of the screw profiles. Also shown in FIG. 2 are.

FIG. 3 shows the screw profiles of the first left screw element 3.1-L and of the first right screw element 3.1-R at the beginning of the first screw element pair from FIG. 2, that is a cross-sectional view of FIG. 2 taken along section plane 3-3. In this figure:

3.1-L first left screw element,
3.2-L direction of rotation of the left screw element,
3.3-L flight land of the left screw element at a greater distance from the centre of rotation of the left screw element than flight land 3.4-L,
3.4-L flight land of the left screw element at a smaller distance from the centre of rotation of the left screw element than flight land 3.3-L,
3.5-L centre of rotation of the left screw element,
3.6-L wide channel between left screw element and circumference line 3.8-L of the left housing bore,

3.7-L narrow channel between left screw element and circumference line 3.8-L of the left housing bore,

3.8-L circumference line of left housing bore,

3.1-R first right screw element,

3.2-R direction of rotation of the right screw element,

3.3-R flight land of the right screw element at a greater distance from the centre of rotation of the right screw element than flight land 3.4-R,

3.4-R flight land of the right screw element at a smaller distance from the centre of rotation of the right screw element than flight land 3.3-R,

3.5-R centre of rotation of the right screw element,

3.6-R wide channel between right screw element and circumference line 3.8-R of right housing bore,

3.7-R narrow channel between right screw element and circumference line 3.8-R of the right housing bore,

3.8-R circumference line of right housing bore,

In the left housing bore, the wide channel 3.6-L is ahead of flight land 3.3-L, which closely cleans the housing inner wall, and the narrow channel 3.7-L is ahead of flight land 3.4-L, which cleans the housing inner wall less closely than flight land 3.3-L. In the right housing bore, the wide channel 3.6-R is ahead of flight land 3.4-R, which cleans the housing inner wall less closely than flight land 3.3-R, whereas flight land 3.3-R, which closely cleans the housing inner wall, is ahead of the narrow channel 3.7-R. The respective housing bore is determined by its circumference line 3.8-L or 3.8-R, the housing inner wall is the outer boundary of the housing bore excluding the intersection, i.e. the overlapping region, which is formed by the circumference lines of the left housing bore 3.8-L and of the right housing bore 3.8-R.

In the right and in the left housing bore, therefore, there are reversed conditions as regards the sequence of the wide channel and the flight land with a narrow or wide gap or of the narrow channel and the flight land with a narrow or wide gap.

FIG. 4 shows, on the left in FIG. 4A, the screw profiles of the first left screw element 3.1-L and of the first right screw element 3.1-R at the end of the first screw element pair from FIG. 2 which clean one another exactly, i.e. a cross-sectional view of FIG. 2 taken along section plane 4A-4A, and on the right thereof, in FIG. 4B, the following screw profiles of the second left screw element 4.1-L and of the second right screw element 4.1-R at the beginning of the second screw element pair which clean one another exactly, i.e. a cross-sectional view of FIG. 2 taken along section plane 4B-4B. In order to ensure that important details of the invention remain clearly visible, not all the features of the screw element pair have been provided with reference signs in FIG. 4—or in the following figures. From the geometry of the objects shown in combination with the illustration from FIG. 3, a person skilled in the art can easily derive all the details necessary for the understanding of FIG. 4—and for the understanding of the following figures.

In this example, the transition from the first screw element pair 3.1-L and 3.1-R from FIG. 2, which clean one another exactly, to the second screw element pair 4.1-L and 4.1-R from FIG. 2, which clean one another exactly, takes place after an eighth of a slope, that is to say after the screw profiles of the first screw element pair have rotated relative to their starting position by 45° about the centre of rotation of the shafts, counter to the direction of rotation of the respective shafts. By reflection of the screw profiles of the first screw element pair 3.1-L and 3.1-R from FIG. 2, which clean one another exactly, across the parallel mirror axes 3.9-L and 3.9-R through the respective centre of rotation 3.5-L and 3.5-R of the screw profiles of the screw elements

3.1-L and 3.1-R and the flight lands 3.3-L and 3.4-L of the left screw element 3.1-L, the screw profiles of the second screw element pair 4.1-L and 4.1-R (shown on the right, in FIG. 4B), which clean one another exactly, are formed.

In the left housing bore, the width of the channels in front of the flight lands 4.3-L and 4.4-L thus changes, with the result that the narrow channel 4.7-L is now ahead of the flight land 4.3-L with the narrow gap relative to the housing inner wall in the direction of rotation, and the wide channel 4.6-L is ahead of the flight land 4.4-L with the wide gap relative to the housing inner wall. In the right housing bore, the flight lands 4.3-R and 4.4-R have simultaneously changed their position with respect to the channels 4.6-R and 4.7-R located in front of them. As a result, in the right housing bore, the narrow channel 4.7-R is now ahead of the flight land 4.4-R with the wide gap relative to the housing inner wall in the direction of rotation, and the wide channel 4.6-R is ahead of the flight land 4.4-R with the narrow gap relative to the housing inner wall.

On the right, in FIG. 5A, FIG. 5 shows the screw profiles of the left screw element 4.1-L and of the right screw element 4.1-R at the end of the second screw element pair from FIG. 2, which clean one another exactly, that is a cross-sectional view of FIG. 2 taken along section plane 5A-5A, and on the left, in FIG. 5B, shows the following screw profiles of the third left screw element 5.1-L and of the third right screw element 5.1-R at the beginning of the third screw element pair which clean one another exactly, that is a cross-sectional view of FIG. 2 taken along section plane 5B-5B.

The transition from the second screw element pair 4.1-L and 4.1-R from FIG. 2, which clean one another exactly, to the third screw element pair 5.1-L and 5.1-R from FIG. 2, which clean one another exactly, takes place after a further eighth of a slope, that is to say after the screw profiles of the second screw element pair have rotated relative to their starting position by a further 45° about the centre of rotation of the shafts, counter to the direction of rotation of the respective shafts.

By reflection of the screw profiles of the second screw element pair 4.1-L and 4.1-R from FIG. 2, which clean one another exactly, across the parallel mirror axes 4.9-L and 4.9-R, depicted on the right, through the respective centre of rotation 4.5-L and 4.5-R of the screw profiles and the flight lands 4.3-R and 4.4-R of the right screw element, the screw profiles of the following third screw element pair 5.1-L and 5.1-R (shown on the left, in FIG. 5B) are formed.

In the transition from the second to the third screw element in the right housing bore, the width of the channels in front of the flight lands 5.3-R and 5.4-R has thus now changed, with the result that, in the right housing bore, the narrow channel 5.7-R is now ahead of the flight land 5.3-R with the narrow gap relative to the housing inner wall in the direction of rotation, and the wide channel 5.6-R is ahead of the flight land 5.4-R with the wide gap relative to the housing inner wall. At the same time, the flight lands 5.3-L and 5.4-L have changed position in the left housing bore. As a result, in the left housing bore, the wide channel 5.6-L is now ahead of the flight land 5.3-L with the narrow gap relative to the housing inner wall in the direction of rotation, and the narrow channel 5.7-L is ahead of the flight land 5.4-L with the wide gap relative to the housing inner wall.

On the left, in FIG. 6A, FIG. 6 shows—analogously to FIG. 4—the screw profiles of the left screw element 5.1-L and of the right screw element 5.1-R at the end of the third screw element pair from FIG. 2, which clean one another exactly, that is a cross-sectional view of FIG. 2 taken along section plane 6A-6A, and on the right, in FIG. 6B, shows the following screw profiles of the fourth left screw element 6.1-L and of the fourth right screw element 6.1-R at the beginning of the fourth screw element pair which clean one another exactly, that is a cross-sectional view of FIG. 2 taken along section plane 6B-6B.

The transition from the third screw element pair 5.1-L and 5.1-R from FIG. 2, which clean one another exactly, to the fourth screw element pair 6.1-L and 6.1-R from FIG. 2, which clean one another exactly, once again takes place after an eighth of a slope, that is to say after the screw profiles of the third screw element pair have rotated relative to their starting position by 45° about the centre of rotation of the shafts, counter to the direction of rotation of the respective shafts. By reflection of the screw profiles of the third screw element pair 5.1-L and 5.1-R from FIG. 2, which clean one another exactly, across the parallel mirror axes 5.9-L and 5.9-R through the respective centre of rotation 5.5-L and 5.5-R of the screw profiles of the screw elements 5.1-L and 5.1-R and the flight lands 5.3-L and 5.4-L of the left screw element 5.1-L, the screw profiles of the fourth screw element pair 6.1-L and 6.1-R (shown on the right, in FIG. 6B), which clean one another exactly, are formed.

In the left housing bore—analogously to FIG. 4—the width of the channels in front of the flight lands 6.3-L and 6.4-L thus changes, with the result that the narrow channel 6.7-L is now ahead of the flight land 6.3-L with the narrow gap relative to the housing inner wall in the direction of rotation, and the wide channel 6.6-L is ahead of the flight land 6.4-L with the wide gap relative to the housing inner wall. In the right housing bore, the flight lands 6.3-R and 6.4-R have simultaneously changed their position with respect to the channels 6.6-R and 6.7-R located in front of them in the direction of rotation. As a result, in the right housing bore, the narrow channel 6.7-R is now ahead of the flight land 6.4-R with the wide gap relative to the housing inner wall in the direction of rotation, and the wide channel 6.6-R is ahead of the flight land 6.4-R with the narrow gap relative to the housing inner wall.

On the right, in FIG. 7A, FIG. 7 shows—analogously to FIG. 5—the screw profiles of the left screw element 6.1-L and of the right screw element 6.1-R at the end of the fourth screw element pair from FIG. 2, which clean one another exactly, that is a cross-sectional view of FIG. 2 taken along section plane 7A-7A, and on the right, in FIG. 7B, shows the following screw profiles of the fifth left screw element 7.1-L and of the fifth right screw element 7.1-R at the beginning of the fifth screw element pair which clean one another exactly, that is a cross-sectional view of FIG. 2 taken along section plane 7B-7B.

The transition from the fourth screw element pair 6.1-L and 6.1-R from FIG. 2, which clean one another exactly, to the fifth screw element pair 7.1-L and 7.1-R from FIG. 2, which clean one another exactly, takes place after a further eighth of a slope, that is to say after the screw profiles of the fourth screw element pair have rotated relative to their starting position by a further 45° about the centre of rotation of the shafts, counter to the direction of rotation of the respective shafts.

By reflection of the screw profiles of the fourth screw element pair 6.1-L and 6.1-R from FIG. 2, which clean one another exactly, across the parallel mirror axes 6.9-L and 6.9-R, depicted on the right, through the respective centres of rotation 6.5-L and 6.5-R of the screw profiles and the flight lands 6.3-R and 6.4-R of the right screw element, the screw profiles of the following fifth screw element pair 7.1-L and 7.1-R from FIG. 2 (shown on the left, in FIG. 7B) are formed. In this case, the parallel mirror axes 6.9-L and 6.9-R coincide to form one mirror axis, with the result that they are visible as just one mirror axis in FIG. 7.

During the transition from the fourth to the fifth screw element, the width of the channels in front of the flight lands 7.3-R and 7.4-R has now changed in the right-hand housing bore, analogously to FIG. 5. As a result, in the right housing bore, the narrow channel 7.7-R is now ahead of the flight land 7.3-R with the narrow gap relative to the housing inner wall in the direction of rotation, and the wide channel 7.6-R is ahead of the flight land 4.4-R with the wide gap relative to the housing inner wall. At the same time, the flight lands 7.3-L and 7.4-L have changed position in the left housing bore. As a result, in the left housing bore, the wide channel 7.6-L is now ahead of the flight land 7.3-L with the narrow gap relative to the housing inner wall in the direction of rotation, and the narrow channel 7.7-L is ahead of the flight land 7.4-L with the wide gap relative to the housing inner wall.

FIGS. 6 and 7 thus represent the continuation of the arrangement of screw elements and screw element pairs to a process range of any length.

DETAILED DESCRIPTION

As a preferred option according to the invention,
the screw profile of the second screw element of the at least two directly successive screw elements with an asymmetrical screw profile on a first screw shaft of the at least two directly adjacent screw shafts is a mirror image, produced by reflection at a mirror axis in the plane of the screw profile, of the first of the at least two directly successive screw elements with an asymmetrical screw profile on this first screw shaft of the at least two directly adjacent screw shafts.

This preferred embodiment of the method of the invention is a second embodiment in accordance with the first embodiment presented above.

As an alternative preference according to the invention,
the screw profile of the first screw element and the screw profile of the second screw element of the at least two directly successive screw elements with an asymmetrical screw profile on a first screw shaft of the at least two directly adjacent screw shafts are configured as screw profiles which clean one another exactly,
and wherein
the screw profile of the second screw element is not a mirror image, produced by reflection at a mirror axis, of the screw profile of the first screw element.

This alternative preference for an embodiment of the method of the invention is a third embodiment in accordance with the first embodiment presented above.

Thus, two screw elements, the screw profiles of which are configured in accordance with this third embodiment, and which rotate in an extruder having two or more parallel screw shafts that rotate in the same sense and at the same speed,
the directly adjacent axes of rotation of which all have the same axis spacing a, and
having two or more interpenetrating circular housing bores around the respective axes of rotation, each of which has an identical housing inner diameter dg and the respective directly adjacent bore centres of which have a spacing which is equal to the axis spacing a, and the respective directly adjacent bore centres of which coincide with the centres of the cross sections of the respective directly adjacent axes of rotation of the screw shafts, would clean one another exactly if they were situated directly opposite one another on two directly adjacent screw shafts.

According to the invention, it is preferred in the third embodiment that the surface of the screw profile of the first screw element and the surface of the screw profile of the second screw element are different.

As a particular preference according to the invention, the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, has the same screw profile as the first screw element with an asymmetrical screw profile, which is situated on the first screw shaft of the at least two directly adjacent screw shafts.

This particularly preferred embodiment of the method of the invention is a fourth embodiment in accordance with the second embodiment presented above.

As a further particular preference according to the invention, the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, has a screw profile which differs from the screw profile of the first screw element with an asymmetrical screw profile, which is situated on the first screw shaft of the at least two directly adjacent screw shafts.

This further particularly preferred embodiment of the method of the invention is a fifth embodiment in accordance with the second embodiment presented above or in accordance with the third embodiment presented above.

As a very particular preference according to the invention, the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, has a screw profile which differs from the screw profile of the first screw element with an asymmetrical screw profile, which is situated on the first screw shaft of the at least two directly adjacent screw shafts, and has a screw profile which is a mirror image, produced by reflection at a mirror axis, of the screw profile of the first screw element with an asymmetrical screw profile, which is situated on the first screw shaft of the at least two directly adjacent screw shafts.

This very particularly preferred embodiment of the method of the invention is a sixth embodiment in accordance with the second embodiment presented above or in accordance with the fifth embodiment presented above.

As an alternative very particular preference according to the invention, the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, has neither a screw profile which is a mirror image, produced by reflection at a mirror axis, of the screw profile of the first screw element with an asymmetrical screw profile, which is situated on the first screw shaft of the at least two directly adjacent screw shafts, nor the same screw profile as the first screw element with an asymmetrical screw profile, which is situated on the first screw shaft of the at least two directly adjacent screw shafts.

This very particularly preferred embodiment of the method of the invention is a seventh embodiment in accordance with the second embodiment presented above or in accordance with the fifth embodiment presented above.

In addition, as an alternative particular preference according to the invention, in each case at least three screw elements with an asymmetrical screw profile are situated directly opposite one another on at least two directly adjacent screw shafts, wherein the at least three screw elements which are situated on in each case one screw shaft follow on directly from one another axially, and wherein the screw profile of the third screw element of the at least three directly successive screw elements with an asymmetrical screw profile on a first screw shaft of the at least two directly adjacent screw shafts is the same as the screw profile of the first screw element of the at least three directly successive screw elements with an asymmetrical screw profile on a first screw shaft of the at least two directly adjacent screw shafts.

This additional alternative particularly preferred embodiment of the method of the invention is an eighth embodiment in accordance with the second embodiment presented above or in accordance with the third embodiment presented above.

For this alternative particularly preferred eighth embodiment of the method of the invention, it is the case, in particular, that the screw profile of the third screw element of the at least three directly successive screw elements with an asymmetrical screw profile on a second screw shaft of the at least two directly adjacent screw shafts is the same as the screw profile of the first screw element of the at least three directly successive screw elements with an asymmetrical screw profile on a second screw shaft of the at least two directly adjacent screw shafts.

As an especial preference according to the invention, in each case at least four screw elements with an asymmetrical screw profile are situated directly opposite one another on at least two directly adjacent screw shafts, wherein the at least four screw elements which are situated on in each case one screw shaft follow on directly from one another axially, and wherein the screw profile of the fourth screw element of the at least four directly successive screw elements with an asymmetrical screw profile on a first screw shaft of the at least two directly adjacent screw shafts is the same as the screw profile of the second screw element of the at least four directly successive screw elements with an asymmetrical screw profile on a first screw shaft of the at least two directly adjacent screw shafts.

This especially preferred embodiment of the method of the invention is a ninth embodiment in accordance with the eighth embodiment presented above.

For this especially preferred ninth embodiment of the method of the invention, it is furthermore the case, in particular, that the screw profile of the fourth screw element of the at least four directly successive screw elements with an asymmetrical screw profile on a second screw shaft of the at least two directly adjacent screw shafts is the same as the screw profile of the second screw element of the at least four directly successive screw elements with an asymmetrical screw profile on a second screw shaft of the at least two directly adjacent screw shafts.

As an especially particularly preferred option according to the invention, in each case an equal number and more than four screw elements with an asymmetrical screw profile are situated directly opposite one another on at least two directly adjacent screw shafts, wherein the equal number and more than four screw elements which are situated on in each case one screw shaft follow on directly from one another axially, and wherein starting from a first screw element with an asymmetrical screw profile, the in each case immediately following screw element has a screw profile which is configured as a screw profile which cleans the screw profile of the immediately preceding screw element exactly, and the screw profile of the second screw element is not a mirror image, produced by reflection at a mirror axis, of the screw profile of the first screw element.

This especially particularly preferred embodiment of the method of the invention is a tenth embodiment in accordance with the ninth embodiment presented above.

As an alternative especially particularly preferred option according to the invention, in each case an equal number and more than four screw elements with an asymmetrical screw profile are situated directly opposite one another on at least two directly adjacent screw shafts, wherein the equal number and more than four screw elements which are situated on in each case one screw shaft follow on directly from one another axially, and wherein starting from a first screw element with an asymmetrical screw profile, the screw element which in each case immediately follows on the same screw shaft has a screw profile which is a mirror image, produced by reflection at a mirror axis, of the screw profile of the first screw element of the two directly successive screw elements and which does not exactly clean the screw profile of the first screw element of the two directly successive screw elements.

This alternative especially particularly preferred embodiment of the method of the invention is an eleventh embodiment in accordance with the ninth embodiment presented above.

In addition, as an alternative preference according to the invention, the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, has a screw profile which differs from the screw profile of the first screw element with an asymmetrical screw profile, which is situated on the first screw shaft of the at least two directly adjacent screw shafts, and has a screw profile which is not a mirror image, produced by reflection at a mirror axis, of the screw profile of the first screw element with an asymmetrical screw profile, which is situated on the first screw shaft of the at least two directly adjacent screw shafts, and wherein the screw profile of the second screw element of the at least two directly successive screw elements with an asymmetrical screw profile on a first screw shaft of the at least two directly adjacent screw shafts is a mirror image, produced by reflection at a mirror axis, of the first of the at least two directly successive screw elements with an asymmetrical screw profile on the second screw shaft of the at least two directly adjacent screw shafts, and the screw profile of the second screw element of the at least two directly successive screw elements with an asymmetrical screw profile on a second screw shaft of the at least two directly adjacent screw shafts is a mirror image, produced by reflection at a mirror axis, of the first of the at least two directly successive screw elements with an asymmetrical screw profile on the first screw shaft of the at least two directly adjacent screw shafts.

This additional alternative preference for an embodiment of the method of the invention is a twelfth embodiment in accordance with the first embodiment presented above.

As a particular preference according to the invention, the screw profile of a third screw element, which immediately follows the second of the at least two directly successive screw elements with an asymmetrical screw profile on a first screw shaft of the at least two directly adjacent screw shafts, has a screw profile which corresponds to the screw profile of the first screw element of the at least two directly successive screw elements with an asymmetrical screw profile on a first screw shaft of the at least two directly adjacent screw shafts, and the screw profile of a third screw element, which immediately follows the second of the at least two directly successive screw elements with an asymmetrical screw profile on a second screw shaft of the at least two directly adjacent screw shafts, has a screw profile which corresponds to the screw profile of the first screw element of the at least two directly successive screw elements with an asymmetrical screw profile on a second screw shaft of the at least two directly adjacent screw shafts.

This particularly preferred embodiment of the method of the invention is a thirteenth embodiment in accordance with the twelfth embodiment presented above.

As a very particular preference according to the invention, the screw profile of a fourth screw element, which immediately follows the third of the at least two directly successive screw elements with an asymmetrical screw profile on a first screw shaft of the at least two directly adjacent screw shafts, has a screw profile which corresponds to the screw profile of the second screw element of the at least two directly successive screw elements with an asymmetrical screw profile on a first screw shaft of the at least two directly adjacent screw shafts, and the screw profile of a fourth screw element, which immediately follows the third of the at least two directly successive screw elements with an asymmetrical screw profile on a second screw shaft of the at least two directly adjacent screw shafts, has a screw profile which corresponds to the screw profile of the second screw element of the at least two directly successive screw elements with an asymmetrical screw profile on a second screw shaft of the at least two directly adjacent screw shafts.

This very particularly preferred embodiment of the method of the invention is a fourteenth embodiment in accordance with the thirteenth embodiment presented above.

The arrangement of the screw elements in accordance with the twelfth embodiment, the thirteenth embodiment, or the fourteenth embodiment can be continued as desired on the directly adjacent screw shafts.

As a particular preference according to the invention, in each case an equal number and more than four screw elements with an asymmetrical screw profile are situated directly opposite one another on at least two directly adjacent screw shafts, wherein the more than four screw elements which are situated on in each case one screw shaft follow on directly from one another axially, and wherein, starting from a first screw element with an asymmetrical screw profile, the in each case immediately following screw element has a screw profile which is not a mirror image, produced by reflection at a mirror axis, of the screw profile of the first screw element of the two directly successive screw elements with an asymmetrical screw profile, which is situated on the same screw shaft of the at least two directly adjacent screw shafts, and wherein the screw profile of the in each case directly following screw element of the more than four directly successive screw elements with an asymmetrical screw profile on a first screw shaft of the at least two directly adjacent screw shafts is a mirror image, produced by reflection at a mirror axis, of the first of the two directly successive screw elements with an asymmetrical screw profile on the second screw shaft of the at least two directly adjacent screw shafts, and the screw profile of the in each case directly following screw element of the at least more than four directly successive screw elements with an asymmetrical screw profile on a second screw shaft of the at least two directly adjacent screw shafts is a mirror image, produced by reflection at a mirror axis, of the first of the two directly successive screw elements with an asymmetrical screw profile on the first screw shaft of the at least two directly adjacent screw shafts.

This particularly preferred embodiment of the method of the invention is a fifteenth embodiment in accordance with the first embodiment presented above or in accordance with the fourteenth embodiment presented above.

As a further preference according to the invention, the screw elements with an asymmetrical screw profile which are situated directly opposite one another on at least two directly adjacent screw shafts are designed as single-flight, double-flight, triple-flight or quadruple-flight screw elements, preferably are either only single-flight, or only double-flight, or only triple-flight, or only quadruple-flight screw elements.

This further preference for an embodiment of the method of the invention is a sixteenth embodiment in accordance with the first embodiment presented above.

Moreover, the invention relates to the use of an extruder in accordance with embodiment (1) for production and processing, especially devolatilization or compounding or reactive extrusion, of plastic masses, especially for production and processing of melts or solutions of thermoplastic polymers or melts or solutions of rubbers.

The arrangement according to the invention of screw elements with an asymmetrical screw profile on in each case one screw shaft of a multishaft extruder ensures that it is possible to vary the width of a gap in the same housing bore in the axial direction in relation to the width of the preceding channel in the direction of rotation, irrespective of the width of the gap following on therefrom.

As a result, in the event of partial filling, this prevents one or more channels of a screw shaft or one or more housing bores of a multishaft extruder of the invention from running empty.

This also prevents a situation where—if a multishaft extruder has a devolatilization dome—extrudate accumulates undesirably in the region of a devolatilization dome of a multishaft extruder.

The arrangement of screw elements in accordance with the invention also ensures that sufficient extrudate is exchanged both between the channels of a screw shaft and between the housing bores. Where there are two successive screw elements on a screw shaft, the arrangement, in accordance with the invention, of screw elements thus makes it possible, in the case of the second screw element in the conveying direction, to change the channel volume ahead of a flight land of this second screw element in the conveying direction, irrespective of the position of the corresponding flight land of the preceding screw element. As a result, there is greater heat exchange and greater mixing of the extrudate.

In the context of the present invention, the expression "axially directly successive" in connection with the at least two screw elements with an asymmetrical screw profile which are situated on in each case one screw shaft also includes the case where in each case at least one spacing element can be inserted between these at least two screw elements, that is to say if there are one or more spacing elements between two axially directly successive screw elements with an asymmetrical screw profile, these two screw elements are still considered to be axially directly successive special screw elements. Spacing elements are, for example, inserted between screw elements which follow one another in the conveying direction in order to prevent directly adjacent screw shafts from running into one another on account of axial misalignment, which cannot be avoided from a technical point of view. Such spacing elements are known to a person skilled in the art and can be designed as spacer discs or spacer rings, for example.

Such a spacing element situated between two axially directly successive screw elements with an asymmetrical screw profile which are situated on a screw shaft preferably has an axial length of 1 less than 0.1 dg. It is also possible for a plurality of spacing elements to be situated directly one behind the other between two axially directly successive screw elements with an asymmetrical screw profile which are situated on a screw shaft. In such a case, the sum of the axial lengths of this plurality of spacing elements is preferably less than 0.1 dg.

In the simplest case, a spacing element is a spacer ring with the diameter of the smallest distance of the screw profile from the centre of rotation of the screw element.

However, the transition can also be configured as a suitable three-dimensional transition between the successive profile contours.

The spacing elements prevent directly adjacent screw shafts from running into one another during use as intended owing to axial misalignment, which cannot be avoided from a technical point of view.

A person skilled in the art knows that, in the case of industrially implemented machines, it is necessary to deviate from the exactly cleaning geometry to the extent that constant clearances between the screw elements in question must be maintained during the mutual cleaning of these screw elements. This is necessary in order to prevent metallic "fretting", i.e. cold welding as a result of metallic contact and thus premature wear, in order to compensate for manufacturing tolerances or to avoid excessive energy dissipation in the clearances. Rules for generating cross-sectional screw profiles for screw elements which clean each other exactly are shown, for example, in [1], pages 107-121). According to the description there, in the case of screw elements which clean each other exactly, a predetermined cross-sectional screw profile on the first shaft of a twin-screw extruder determines the cross-sectional screw profile on the second shaft of the twin-screw extruder ([1], page 108). A person skilled in the art therefore understands the term "cleaning one another exactly" in the context of two screw elements which are in each case directly opposite one another on two directly adjacent screw shafts, in an industrially implemented machine in such a way that constant clearances must be maintained between the screw elements in question during the mutual cleaning of these screw elements.

The present invention also provides for the use of the extruder of the invention for production and processing, especially devolatilization or compounding or reactive extrusion, of plastic masses, especially for production and processing of melts or solutions of thermoplastic polymers or melts or solutions of rubbers.

The multishaft extruders of the invention have a number of interpenetrating circular housing bores corresponding to the number of screw shafts and each having an identical inner housing diameter dg.

The bore centres of the housing bores have a spacing which is equal to the axis spacing a, wherein the bore centres coincide with the centres of the cross sections of the respective axes of rotation of the respective screw shafts.

Typically, screw shafts for multishaft extruders according to the prior art are built in modular form from screw elements that are mounted on a screw core. In the multishaft extruder of the invention, in a cross section of the multishaft extruder, the screw elements with an asymmetrical screw profile are arranged opposite one another on the screw shaft in a number corresponding to the number of screw elements of the respective multishaft extruder.

In the extruder of the invention, the screw elements with an asymmetrical screw profile can be present in the form of kneading, conveying or mixing elements; the screw elements with an asymmetrical screw profile are preferably conveying elements or kneading elements.

In the context of the present invention, the term "kneading disk profile", also called "kneading disk cross-sectional profile", is understood to mean the outer contour of a kneading disk in cross section at right angles to the axis of rotation of the kneading disk.

As is well known, it is a feature of a conveying element (see for example [1], pages 136-159) that the screw profile has continuous helical turns continuing in axial direction. The conveying element may be right-handed or left-handed.

As is well known, it is a feature of a kneading element (see for example [1], pages 136-159) that a screw profile has continuous helical turns continuing in axial direction. The arrangement of the kneading disks may be right-handed or left-handed or neutral.

As is well known (see for example [1], pages 136-159), mixing elements are formed in that conveying elements are provided with apertures in the screw flight lands. The mixing elements may be right-handed or left-handed. The apertures preferably have the form of a u-shaped or v-shaped groove, and these are preferably in a counter-conveying or axially parallel arrangement.

Screw elements with an asymmetrical screw profile which lie directly opposite one another on adjacent screw shafts clean one another, taking into account the technically necessary clearances.

In the context of the present invention, plastic masses are especially understood to mean:

suspensions, pastes, glass melts, unfired ceramics, metal melt, or plastics.

In the context of the present invention, plastics are especially understood to mean:

polymers, especially polymer melts or polymer solutions, and in turn especially melts or solutions of thermoplastic polymers or melts or solutions of plastics.

The thermoplastic polymer used is preferably at least one from the group of polycarbonate, polyamide, polyester, in particular polybutylene terephthalate and polyethylene terephthalate, polylactide, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl) methacrylate, polyphenylene oxide, polyphenylene sulfide, polyetherketone, polyaryletherketone, styrene polymers, in particular polystyrene, styrene copolymers, in particular styrene-acrylonitrile copolymer, acrylonitrile-butadiene-styrene block copolymers and polyvinyl chloride. Similarly preferably used are what are known as blends of the polymers listed, which a person skilled in the art understands to be a combination of two or more polymers. Particularly preferred are polycarbonate and mixtures containing polycarbonate, very particularly preferably polycarbonate, which are obtained, for example, by the interfacial process or the melt transesterification process.

The rubber used is preferably at least one from the group of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, arylate rubber, fluorinated rubber, silicone rubber, sulfide rubber and chlorosulfonyl polyethylene rubber. A combination of two or more of the rubbers listed, or a combination of one or more rubbers with one or more other plastics, is of course also possible.

These thermoplastics or rubbers may be used in pure form or as mixtures with fillers and reinforcers, such as in particular glass fibres, as mixtures with one another or with other polymers, or as mixtures with customary polymer additives.

In a preferred embodiment, additives are added to the plastic masses, in particular to the polymer melts and mixtures of polymer melts. Said additives may be added to the extruder in solid, liquid or solution form together with the polymer, or else at least some or all of the additives are fed to the extruder via a side stream.

Additives can provide a polymer with a wide variety of properties. Said additives may, for example, be colourants, pigments, processing aids, fillers, antioxidants, reinforcers, UV absorbers and light stabilizers, metal deactivators, peroxide scavengers, basic stabilizers, nucleating agents, benzofurans and indolinones which have a stabilizing or antioxidant action, mould release agents, flame retardant additives, antistatic agents, dyes and melt stabilizers. Examples of these are carbon black, glass fibres, clay, mica, graphite fibres, titanium dioxide, carbon fibres, carbon nanotubes, ionic liquids and natural fibres.

The invention will be explained in more detail and by way of example below with reference to the figures, but without being restricted thereto.

FIG. 1 shows, in an isometric projection, in each case a section of two directly adjacent screw shafts, a left screw shaft 1.1-L and a right screw shaft 1.1-R, wherein the screw shafts 1.1-L and 1.1-R each have a sequence of conveying elements with a double-flight asymmetrical screw profile and the screw shafts 1.1-L and 1.1-R are suitable for a twin-screw extruder having screw shafts that rotate in the same sense and at the same speed. In this case, the screw profiles on the two screw shafts of directly opposite screw elements are configured to clean one another exactly, with the result that the corresponding screw elements clean one another exactly. The left axis of rotation 1.5-L and the right axis of rotation 1.5-R through the respective centres of rotation of the screw profiles are also depicted in FIG. 1.

FIG. 2 shows the arrangement from FIG. 1 in an orthogonal projection. A left screw shaft 1.1-L (corresponding to the left screw shaft 1.1-L from FIG. 1) and a right screw shaft 1.1-R (corresponding to the right screw shaft 1.1-R from FIG. 1) can be seen. Also visible in FIG. 2 is the left axis of rotation 1.5-L (corresponding to the left axis of rotation 1.5-L from FIG. 1) and the right axis of rotation 1.5-R (corresponding to the right axis of rotation 1.5-L from FIG. 1) through the respective centres of rotation of the screw profiles. Also shown in FIG. 2 are:

3.1-L first left screw element,
3.1-R first right screw element,
4.1-L second left screw element,
4.1-R second right screw element,
5.1-L third left screw element,
5.1-R third right screw element,
6.1-L fourth left screw element,
6.1-R fourth right screw element,
7.1-L fifth left screw element,
7.1-R fifth right screw element,
7.1-L fifth left screw element,
3-3 section plane 3-3 at the beginning of the first screw element pair 3.1-L and 3.1-R,
4A-4A section plane 4A-4A at the end of the first screw element pair 3.1-L and 3.1-R,
4B-4B section plane 4B-4B at the beginning of the second screw element pair 4.1-L and 4.1-R,
5A-5A section plane 5A-5A at the end of the second screw element pair 4.1-L and 4.1-R,
5B-5B section plane 5B-5B at the beginning of the third screw element pair 5.1-L and 5.1-R,
6A-6A section plane 6A-6A at the end of the third screw element pair 5.1-L and 5.1-R,
6B-6B section plane 6B-6B at the beginning of the fourth screw element pair 6.1-L and 6.1-R,
7A-7A section plane 7A-7A at the end of the fourth screw element pair 6.1-L and 6.1-R, 7B-7B section plane 7B-7B at the beginning of the fifth screw element pair 7.1-L and 7.1-R.

The other figures, from FIG. 3 to FIG. 7, further explain the screw element arrangement of the invention without the invention being limited to these embodiments.

FIG. 3 shows the screw profiles of the first left screw element 3.1-L and of the first right screw element 3.1-R at the beginning of the first screw element pair from FIG. 2, that is a cross-sectional view of FIG. 2 taken along section plane 3-3. In this figure:

3.1-L first left screw element,
3.2-L direction of rotation of the left screw element,
3.3-L flight land of the left screw element at a greater distance from the centre of rotation of the left screw element than flight land 3.4-L,
3.4-L flight land of the left screw element at a smaller distance from the centre of rotation of the left screw element than flight land 3.3-L,
3.5-L centre of rotation of the left screw element,
3.6-L wide channel between left screw element and circumference line 3.8-L of the left housing bore,
3.7-L narrow channel between left screw element and circumference line 3.8-L of the left housing bore,
3.8-L circumference line of left housing bore,
3.1-R first right screw element,
3.2-R direction of rotation of the right screw element,
3.3-R flight land of the right screw element at a greater distance from the centre of rotation of the right screw element than flight land 3.4-R,
3.4-R flight land of the right screw element at a smaller distance from the centre of rotation of the right screw element than flight land 3.3-R,
3.5-R centre of rotation of the right screw element,
3.6-R wide channel between right screw element and circumference line 3.8-R of right housing bore,
3.7-R narrow channel between right screw element and circumference line 3.8-R of the right housing bore,
3.8-R circumference line of right housing bore, In the left housing bore, the wide channel 3.6-L is ahead of flight land 3.3-L, which closely cleans the housing inner wall, and the narrow channel 3.7-L is ahead of flight land 3.4-L, which cleans the housing inner wall less closely than flight land 3.3-L. In the right housing bore, the wide channel 3.6-R is ahead of flight land 3.4-R, which cleans the housing inner wall less closely than flight land 3.3-R, whereas flight land 3.3-R, which closely cleans the housing inner wall, is ahead of the narrow channel 3.7-R. The respective housing bore is determined by its circumference line 3.8-L or 3.8-R, the housing inner wall is the outer boundary of the housing bore excluding the intersection, i.e. the overlapping region, which is formed by the circumference lines of the left housing bore 3.8-L and of the right housing bore 3.8-R.

In the right and in the left housing bore, therefore, there are reversed conditions as regards the sequence of the wide channel and the flight land with a narrow or wide gap or of the narrow channel and the flight land with a narrow or wide gap.

FIG. 4 shows, on the left in FIG. 4A, the screw profiles of the first left screw element 3.1-L and of the first right screw element 3.1-R at the end of the first screw element pair from FIG. 2 which clean one another exactly, i.e. a cross-sectional view of FIG. 2 taken along section plane 4A-4A, and on the right thereof, in FIG. 4B, the following screw profiles of the second left screw element 4.1-L and of the second right screw element 4.1-R at the beginning of the second screw element pair which clean one another exactly, i.e. a cross-sectional view of FIG. 2 taken along section plane 4B-4B. In order to ensure that important details of the invention remain clearly visible, not all the features of the screw element pair have been provided with reference signs in FIG. 4—or in the following figures. From the geometry of the objects shown in combination with the illustration from FIG. 3, a person skilled in the art can easily derive all the details necessary for the understanding of FIG. 4—and for the understanding of the following figures.

In this example, the transition from the first screw element pair 3.1-L and 3.1-R from FIG. 2, which clean one another exactly, to the second screw element pair 4.1-L and 4.1-R from FIG. 2, which clean one another exactly, takes place after an eighth of a slope, that is to say after the screw profiles of the first screw element pair have rotated relative to their starting position by 45° about the centre of rotation of the shafts, counter to the direction of rotation of the respective shafts. By reflection of the screw profiles of the first screw element pair 3.1-L and 3.1-R from FIG. 2, which clean one another exactly, across the parallel mirror axes 3.9-L and 3.9-R through the respective centre of rotation 3.5-L and 3.5-R of the screw profiles of the screw elements 3.1-L and 3.1-R and the flight lands 3.3-L and 3.4-L of the left screw element 3.1-L, the screw profiles of the second screw element pair 4.1-L and 4.1-R (shown on the right, in FIG. 4B), which clean one another exactly, are formed.

In the left housing bore, the width of the channels in front of the flight lands 4.3-L and 4.4-L thus changes, with the result that the narrow channel 4.7-L is now ahead of the flight land 4.3-L with the narrow gap relative to the housing inner wall in the direction of rotation, and the wide channel 4.6-L is ahead of the flight land 4.4-L with the wide gap relative to the housing inner wall. In the right housing bore, the flight lands 4.3-R and 4.4-R have simultaneously changed their position with respect to the channels 4.6-R and 4.7-R located in front of them. As a result, in the right housing bore, the narrow channel 4.7-R is now ahead of the flight land 4.4-R with the wide gap relative to the housing inner wall in the direction of rotation, and the wide channel 4.6-R is ahead of the flight land 4.4-R with the narrow gap relative to the housing inner wall.

On the right, in FIG. 5A, FIG. 5 shows the screw profiles of the left screw element 4.1-L and of the right screw element 4.1-R at the end of the second screw element pair from FIG. 2, which clean one another exactly, that is a cross-sectional view of FIG. 2 taken along section plane 5A-5A, and on the left, in FIG. 5B, shows the following screw profiles of the third left screw element 5.1-L and of the third right screw element 5.1-R at the beginning of the third screw element pair which clean one another exactly, that is a cross-sectional view of FIG. 2 taken along section plane 5B-5B.

The transition from the second screw element pair 4.1-L and 4.1-R from FIG. 2, which clean one another exactly, to the third screw element pair 5.1-L and 5.1-R from FIG. 2, which clean one another exactly, takes place after a further eighth of a slope, that is to say after the screw profiles of the second screw element pair have rotated relative to their starting position by a further 45° about the centre of rotation of the shafts, counter to the direction of rotation of the respective shafts.

By reflection of the screw profiles of the second screw element pair 4.1-L and 4.1-R from FIG. 2, which clean one another exactly, across the parallel mirror axes 4.9-L and 4.9-R, depicted on the right, through the respective centre of rotation 4.5-L and 4.5-R of the screw profiles and the flight lands 4.3-R and 4.4-R of the right screw element, the screw profiles of the following third screw element pair 5.1-L and 5.1-R (shown on the left, in FIG. 5B) are formed.

In the transition from the second to the third screw element in the right housing bore, the width of the channels in front of the flight lands 5.3-R and 5.4-R has thus now changed, with the result that, in the right housing bore, the narrow channel 5.7-R is now ahead of the flight land 5.3-R with the narrow gap relative to the housing inner wall in the direction of rotation, and the wide channel 5.6-R is ahead of the flight land 5.4-R with the wide gap relative to the housing inner wall. At the same time, the flight lands 5.3-L and 5.4-L have changed position in the left housing bore. As a result, in the left housing bore, the wide channel 5.6-L is now ahead of the flight land 5.3-L with the narrow gap relative to the housing inner wall in the direction of rotation, and the narrow channel 5.7-L is ahead of the flight land 5.4-L with the wide gap relative to the housing inner wall.

On the left, in FIG. 6A, FIG. 6 shows—analogously to FIG. 4—the screw profiles of the left screw element 5.1-L and of the right screw element 5.1-R at the end of the third screw element pair from FIG. 2, which clean one another exactly, that is a cross-sectional view of FIG. 2 taken along section plane 6A-6A, and on the right, in FIG. 6B, shows the following screw profiles of the fourth left screw element 6.1-L and of the fourth right screw element 6.1-R at the beginning of the fourth screw element pair which clean one another exactly, that is a cross-sectional view of FIG. 2 taken along section plane 6B-6B.

The transition from the third screw element pair 5.1-L and 5.1-R from FIG. 2, which clean one another exactly, to the fourth screw element pair 6.1-L and 6.1-R from FIG. 2, which clean one another exactly, once again takes place after an eighth of a slope, that is to say after the screw profiles of the third screw element pair have rotated relative to their starting position by 45° about the centre of rotation of the shafts, counter to the direction of rotation of the respective shafts. By reflection of the screw profiles of the third screw element pair 5.1-L and 5.1-R from FIG. 2, which clean one another exactly, across the parallel mirror axes 5.9-L and 5.9-R through the respective centre of rotation 5.5-L and 5.5-R of the screw profiles of the screw elements 5.1-L and 5.1-R and the flight lands 5.3-L and 5.4-L of the left screw element 5.1-L, the screw profiles of the fourth screw element pair 6.1-L and 6.1-R (shown on the right, in FIG. 6B), which clean one another exactly, are formed.

In the left housing bore—analogously to FIG. 4—the width of the channels in front of the flight lands 6.3-L and 6.4-L thus changes, with the result that the narrow channel 6.7-L is now ahead of the flight land 6.3-L with the narrow gap relative to the housing inner wall in the direction of rotation, and the wide channel 6.6-L is ahead of the flight land 6.4-L with the wide gap relative to the housing inner wall. In the right housing bore, the flight lands 6.3-R and 6.4-R have simultaneously changed their position with respect to the channels 6.6-R and 6.7-R located in front of them in the direction of rotation. As a result, in the right housing bore, the narrow channel 6.7-R is now ahead of the flight land 6.4-R with the wide gap relative to the housing inner wall in the direction of rotation, and the wide channel 6.6-R is ahead of the flight land 6.4-R with the narrow gap relative to the housing inner wall.

On the right, in FIG. 7A, FIG. 7 shows—analogously to FIG. 5—the screw profiles of the left screw element 6.1-L and of the right screw element 6.1-R at the end of the fourth screw element pair from FIG. 2, which clean one another exactly, that is a cross-sectional view of FIG. 2 taken along section plane 7A-7A, and on the right, in FIG. 7B, shows the following screw profiles of the fifth left screw element 7.1-L and of the fifth right screw element 7.1-R at the beginning of the fifth screw element pair which clean one another exactly, that is a cross-sectional view of FIG. 2 taken along section plane 7B-7B.

The transition from the fourth screw element pair 6.1-L and 6.1-R from FIG. 2, which clean one another exactly, to the fifth screw element pair 7.1-L and 7.1-R from FIG. 2, which clean one another exactly, takes place after a further eighth of a slope, that is to say after the screw profiles of the fourth screw element pair have rotated relative to their starting position by a further 45° about the centre of rotation of the shafts, counter to the direction of rotation of the respective shafts.

By reflection of the screw profiles of the fourth screw element pair 6.1-L and 6.1-R from FIG. 2, which clean one another exactly, across the parallel mirror axes 6.9-L and 6.9-R, depicted on the right, through the respective centres of rotation 6.5-L and 6.5-R of the screw profiles and the flight lands 6.3-R and 6.4-R of the right screw element, the screw profiles of the following fifth screw element pair 7.1-L and 7.1-R from FIG. 2 (shown on the left, in FIG. 7B) are formed. In this case, the parallel mirror axes 6.9-L and 6.9-R coincide to form one mirror axis, with the result that they are visible as just one mirror axis in FIG. 7.

During the transition from the fourth to the fifth screw element, the width of the channels in front of the flight lands 7.3-R and 7.4-R has now changed in the right-hand housing bore, analogously to FIG. 5. As a result, in the right housing bore, the narrow channel 7.7-R is now ahead of the flight land 7.3-R with the narrow gap relative to the housing inner wall in the direction of rotation, and the wide channel 7.6-R is ahead of the flight land 4.4-R with the wide gap relative to the housing inner wall. At the same time, the flight lands 7.3-L and 7.4-L have changed position in the left housing bore. As a result, in the left housing bore, the wide channel 7.6-L is now ahead of the flight land 7.3-L with the narrow gap relative to the housing inner wall in the direction of rotation, and the narrow channel 7.7-L is ahead of the flight land 7.4-L with the wide gap relative to the housing inner wall.

FIGS. 6 and 7 thus represent the continuation of the arrangement of screw elements and screw element pairs to a process range of any length.

The invention claimed is:

1. An extruder, the extruder comprising:

two or more parallel screw shafts that rotate in the same sense and at the same speed, wherein the directly adjacent axes of rotation of which all have the same axis spacing a; and two or more interpenetrating circular housing bores around the respective axes of rotation, wherein each of the two or more interpenetrating circular housing bores has an identical housing inner diameter dg, and wherein the respective directly adjacent bore centres of which have a spacing which is equal to the axis spacing a, and wherein the respective directly adjacent bore centres of which coincide with the centres of the cross sections of the respective directly adjacent axes of rotation of the screw shafts, wherein in each case at least two screw elements with an asymmetrical screw profile are situated directly opposite one another on at least two directly adjacent screw shafts, and wherein the screw elements with an asymmetrical screw profile which are situated directly opposite one another on at least two directly adjacent screw shafts clean one another exactly, and wherein the at least two screw elements with an asymmetrical screw profile which are situated on in each case one screw shaft follow on directly from one another axially, wherein the screw profile of the second screw element of the at least two directly successive screw elements with an asymmetrical screw profile on a first screw shaft of the at least two directly adjacent screw shafts is a screw profile which is not congruent with the screw profile of the first of the at least two directly successive screw elements with an asymmetrical screw profile on the first screw shaft of the at least two directly adjacent screw shafts, wherein a screw profile is asymmetrical if, for the respective screw profile, there is no mirror axis through any point in the plane of the respective screw profile by means of which a screw profile which is congruent with this screw profile can be produced, and wherein two screw profiles are not congruent if a first screw profile and a second screw profile cannot be transformed into one another either by rotation or translation on the plane of the screw profile or by rotation and translation on the plane of the screw profile.

2. The extruder according to claim 1, wherein:

the screw profile of the second screw element of the at least two directly successive screw elements with an asymmetrical screw profile on a first screw shaft of the at least two directly adjacent screw shafts is a mirror image, produced by reflection at a mirror axis in the plane of the screw profile, of the screw profile of the first of the at least two directly successive screw elements with an asymmetrical screw profile on this first screw shaft of the at least two directly adjacent screw shafts.

3. The extruder according to claim 2, wherein;

the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, comprises the same screw profile as the first screw element with an asymmetrical screw profile, which is situated on the first screw shaft of the at least two directly adjacent screw shafts.

4. The extruder according to claim 2, wherein;

the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, comprises a screw profile which differs from the screw profile of the first screw element with an asymmetrical screw profile, which is situated on the first screw shaft of the at least two directly adjacent screw shafts.

5. The extruder according to claim 2, wherein:

the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, comprises a screw profile which differs from the screw profile of the first screw element with an asymmetrical screw profile, which is situated on the first screw shaft of the at least two directly adjacent screw shafts, and a screw profile which is a mirror image, produced by reflection at a mirror axis, of the screw profile of the first screw element with an asymmetrical screw profile, which is situated on the first screw shaft of the at least two directly adjacent screw shafts.

6. The extruder according to claim 2, wherein;
the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, comprises neither a screw profile which is a mirror image, produced by reflection at a mirror axis, of the screw profile of the first screw element with an asymmetrical screw profile, which is situated on the first screw shaft of the at least two directly adjacent screw shafts, nor the same screw profile as the first screw element with an asymmetrical screw profile, which is situated on the first screw shaft of the at least two directly adjacent screw shafts.

7. The extruder according to claim 2, wherein:
in each case at least three screw elements with an asymmetrical screw profile are situated directly opposite one another on at least two directly adjacent screw shafts, wherein the at least three screw elements which are situated on in each case one screw shaft follow on directly from one another axially, and
the screw profile of the third screw element of the at least three directly successive screw elements with an asymmetrical screw profile on a first screw shaft of the at least two directly adjacent screw shafts is the same as the screw profile of the first screw element of the at least three directly successive screw elements with an asymmetrical screw profile on a first screw shaft of the at least two directly adjacent screw shafts.

8. The extruder according to claim 7, wherein;
in each case at least four screw elements with an asymmetrical screw profile are situated directly opposite one another on at least two directly adjacent screw shafts,
the at least four screw elements which are situated on in each case one screw shaft follow on directly from one another axially, and
the screw profile of the fourth screw element of the at least four directly successive screw elements with an asymmetrical screw profile on a first screw shaft of the at least two directly adjacent screw shafts is the same as the screw profile of the second screw element of the at least four directly successive screw elements with an asymmetrical screw profile on a first screw shaft of the at least two directly adjacent screw shafts.

9. The extruder according to claim 8, wherein:
in each case an equal number and more than four screw elements with an asymmetrical screw profile are situated directly opposite one another on at least two directly adjacent screw shafts,
the equal number and more than four screw elements which are situated on in each case one screw shaft follow on directly from one another axially, and
starting from a first screw element with an asymmetrical screw profile, the in each case immediately following screw element has a screw profile which is configured as a screw profile which cleans the screw profile of the immediately preceding screw element exactly, and the screw profile of the second screw element is not a mirror image, produced by reflection at a mirror axis, of the screw profile of the first screw element.

10. The extruder according to claim 8, wherein;
in each case an equal number and more than four screw elements with an asymmetrical screw profile are situated directly opposite one another on at least two directly adjacent screw shafts,
the equal number and more than four screw elements which are situated on in each case one screw shaft follow on directly from one another axially, and
starting from a first screw element with an asymmetrical screw profile, the screw element which in each case immediately follows on the same screw shaft has a screw profile which is a mirror image, produced by reflection at a mirror axis, of the screw profile of the first screw element of the two directly successive screw elements and which does not exactly clean the screw profile of the first screw element of the two directly successive screw elements.

11. The extruder according to claim 1, wherein;
the screw profile of the first screw element and the screw profile of the second screw element of the at least two directly successive screw elements with an asymmetrical screw profile on a first screw shaft of the at least two directly adjacent screw shafts are configured as screw profiles which clean one another exactly, and
the screw profile of the second screw element is not a mirror image, produced by reflection at a mirror axis, of the screw profile of the first screw element.

12. The extruder according to claim 1, wherein;
the screw element with an asymmetrical screw profile, which is situated on a second screw shaft of the at least two directly adjacent screw shafts, directly opposite the first screw element with an asymmetrical screw profile on the first screw shaft of the at least two directly adjacent screw shafts, comprises:
a screw profile which differs from the screw profile of the first screw element with an asymmetrical screw profile, which is situated on the first screw shaft of the at least two directly adjacent screw shafts, and
a screw profile which is not a mirror image, produced by reflection at a mirror axis, of the screw profile of the first screw element with an asymmetrical screw profile, which is situated on the first screw shaft of the at least two directly adjacent screw shafts,
wherein:
the screw profile of the second screw element of the at least two directly successive screw elements with an asymmetrical screw profile on a first screw shaft of the at least two directly adjacent screw shafts is a mirror image, produced by reflection at a mirror axis, of the first of the at least two directly successive screw elements with an asymmetrical screw profile on the second screw shaft of the at least two directly adjacent screw shafts, and
the screw profile of the second screw element of the at least two directly successive screw elements with an asymmetrical screw profile on a second screw shaft of the at least two directly adjacent screw shafts is a mirror image, produced by reflection at a mirror axis, of the first of the at least two directly successive screw elements with an asymmetrical screw profile on the first screw shaft of the at least two directly adjacent screw shafts.

13. The extruder according to claim 12, wherein;
the screw profile of a third screw element, which immediately follows the second of the at least two directly successive screw elements with an asymmetrical screw profile on a first screw shaft of the at least two directly adjacent screw shafts, comprises a screw profile which corresponds to the screw profile of the first screw element of the at least two directly successive screw elements with an asymmetrical screw profile on a first screw shaft of the at least two directly adjacent screw shafts, and the screw profile of a third screw element, which immediately follows the second of the at least two directly successive screw elements with an asymmetrical screw profile on a second screw shaft of the at least two directly adjacent screw shafts, comprises a screw profile which corresponds to the screw profile of the first screw element of the at least two directly successive screw elements with an asymmetrical screw profile on a second screw shaft of the at least two directly adjacent screw shafts.

14. The extruder according to claim 13, wherein;

the screw profile of a fourth screw element, which immediately follows the third of the at least two directly successive screw elements with an asymmetrical screw profile on a first screw shaft of the at least two directly adjacent screw shafts, comprises a screw profile which corresponds to the screw profile of the second screw element of the at least two directly successive screw elements with an asymmetrical screw profile on a first screw shaft of the at least two directly adjacent screw shafts, and the screw profile of a fourth screw element, which immediately follows the third of the at least two directly successive screw elements with an asymmetrical screw profile on a second screw shaft of the at least two directly adjacent screw shafts, comprises a screw profile which corresponds to the screw profile of the second screw element of the at least two directly successive screw elements with an asymmetrical screw profile on a second screw shaft of the at least two directly adjacent screw shafts.

15. The extruder according to claim 1, wherein:

in each case an equal number and more than four screw elements with an asymmetrical screw profile are situated directly opposite one another on at least two directly adjacent screw shafts, the more than four screw elements which are situated on in each case one screw shaft follow on directly from one another axially, starting from a first screw element with an asymmetrical screw profile, the in each case immediately following screw element comprises a screw profile which is not a mirror image, produced by reflection at a mirror axis, of the screw profile of the first screw element of the two directly successive screw elements with an asymmetrical screw profile, which is situated on the same screw shaft of the at least two directly adjacent screw shafts, the screw profile of the in each case directly following screw element of the more than four directly successive screw elements with an asymmetrical screw profile on a first screw shaft of the at least two directly adjacent screw shafts is a mirror image, produced by reflection at a mirror axis, of the first of the two directly successive screw elements with an asymmetrical screw profile on the second screw shaft of the at least two directly adjacent screw shafts, and the screw profile of the in each case directly following screw element of the at least more than four directly successive screw elements with an asymmetrical screw profile on a second screw shaft of the at least two directly adjacent screw shafts is a mirror image, produced by reflection at a mirror axis, of the first of the two directly successive screw elements with an asymmetrical screw profile on the first screw shaft of the at least two directly adjacent screw shafts.

* * * * *